United States Patent
Chang et al.

(10) Patent No.: US 9,697,325 B2
(45) Date of Patent: *Jul. 4, 2017

(54) SYSTEM AND METHOD FOR OPTIMIZATION OF AN IMAGED PATTERN OF A SEMICONDUCTOR DEVICE

(71) Applicant: Taiwan Semiconductor Manufacturing Company, Ltd., Hsin-Chu (TW)

(72) Inventors: Shih-Ming Chang, Hsin-Chu (TW); Ming-Yo Chung, Hsinchu County (TW); Tzu-Chun Lo, New Taipei (TW); Ying-Hao Su, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,487

(22) Filed: Jun. 6, 2016

(65) Prior Publication Data

US 2016/0283644 A1 Sep. 29, 2016

Related U.S. Application Data

(63) Continuation of application No. 14/798,331, filed on Jul. 13, 2015, now Pat. No. 9,361,420, which is a
(Continued)

(51) Int. Cl.
*G06F 17/50* (2006.01)
*G03F 1/36* (2012.01)
(Continued)

(52) U.S. Cl.
CPC .......... *G06F 17/5081* (2013.01); *G03F 1/36* (2013.01); *G03F 1/70* (2013.01); *G06F 17/5068* (2013.01);
(Continued)

(58) Field of Classification Search
None
See application file for complete search history.

(56) References Cited

U.S. PATENT DOCUMENTS

| 6,978,438 B1 | 12/2005 | Capodieci |
| 7,013,439 B2 | 3/2006 | Robles et al. |

(Continued)

FOREIGN PATENT DOCUMENTS

KR 2011-0012798 * 2/2011 ......... G03F 7/70425

OTHER PUBLICATIONS

Depre et al. "Calibrating OPC Models using Asymmetric Structures," Optical Microlithography XIX, Proc. of SPIE vol. 615 2006, 10 pages.*

(Continued)

*Primary Examiner* — Leigh Garbowski
(74) *Attorney, Agent, or Firm* — Haynes and Boone, LLP

(57) ABSTRACT

In a method, a layout of a device having a pattern of features is provided. The method continues to include identifying a first portion of at least one feature of the plurality of features. An image criteria for the first portion may be assigned. A lithography optimization parameter is determined based on the assigned image criteria for the first portion. Finally, the first portion of the at least one feature is imaged onto a semiconductor substrate using the determined lithography optimization parameter.

20 Claims, 15 Drawing Sheets

Related U.S. Application Data continuation of application No. 13/841,862, filed on Mar. 15, 2013, now Pat. No. 9,081,289.

(51) Int. Cl.
  *G03F 1/70* (2012.01)
  *H01L 27/088* (2006.01)

(52) U.S. Cl.
  CPC ...... *G06F 17/5072* (2013.01); *G06F 2217/12* (2013.01); *H01L 27/0886* (2013.01); *H01L 2924/0002* (2013.01)

(56) References Cited

U.S. PATENT DOCUMENTS

| | | | |
|---|---|---|---|
| 7,233,390 B2 | 6/2007 | Chang et al. | |
| 7,269,817 B2 | 9/2007 | Heng et al. | |
| 7,475,383 B2 | 1/2009 | Suh et al. | |
| 8,304,317 B2 | 11/2012 | Gu et al. | |
| 8,542,340 B2 | 9/2013 | Ye et al. | |
| 8,614,034 B2 * | 12/2013 | Moon | G03F 1/36 430/5 |
| 8,786,824 B2 | 7/2014 | Hansen | |
| 9,081,289 B2 * | 7/2015 | Chang | G06F 17/5068 |
| 9,361,420 B2 * | 6/2016 | Chang | G06F 17/5068 |

OTHER PUBLICATIONS

Jessen et al., "Improving Asymmetric Printing and Low Margin Using Custom Illumination for Contact Hole Lithography," [and Process Integration for Microelectronic Manufacturing IV, Proc. of SPIE vol. 6156, 2006, 12 pages.*

Sarma et al., "Optimal SRAF placement for process window enhancement in 65nm/45nm technology," Optical Microlithog XX, Proc. of SPIE vol. 6520, 2007, 7 pages.*

Korean Intellectual Property Office, Korean Notice of Allowance dated Nov. 16, 2016 for application 10-2013-0144736, 4 pages.

* cited by examiner

SYSTEM AND METHOD FOR OPTIMIZATION OF AN IMAGED PATTERN OF A SEMICONDUCTOR DEVICE

PRIORITY DATA

The present application is a continuation application of U.S. patent application Ser. No. 14/798,331, filed Jul. 13, 2015, which is a continuation application of Ser. No. 13/841,862, filed Mar. 15, 2013, now U.S. Pat. No. 9,081,289, which are hereby incorporated by reference in their entirety.

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down however has also increased the complexity of processing and manufacturing ICs and, thus, for these advances to be realized, similar developments in IC manufacturing are needed.

For example, as IC technologies are continually progressing to smaller technology nodes simply scaling down similar designs used at larger feature sizes often results in poorly shaped device features due to the constraints of the available lithography tools. Typically insufficient fidelity between a device feature formed on a substrate as compared to the as-drawn feature provided on a photomask is a common issue. Resolution enhancement techniques (RET) such as optical proximity correction (OPC) have been employed to improve this fidelity. However, performing such rule or model based corrections on an entire design to reach a desired fidelity can be time and resource consuming. Lithography tool advances themselves, such as immersion lithography and other enhancements steppers and scanners, have also been developed. However, the efficiency and effectiveness of these enhancements also presents a challenge. Therefore, while existing methods for improving IC design and manufacturing have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Furthermore, relative terms such as top, bottom, over, under and the like are used for ease of reference and provide a special relationship between features for ease of understanding only and do not necessitate any specific orientation of a device. Further still, various features may be arbitrarily drawn in different scales for simplicity and clarity.

Figure 1:
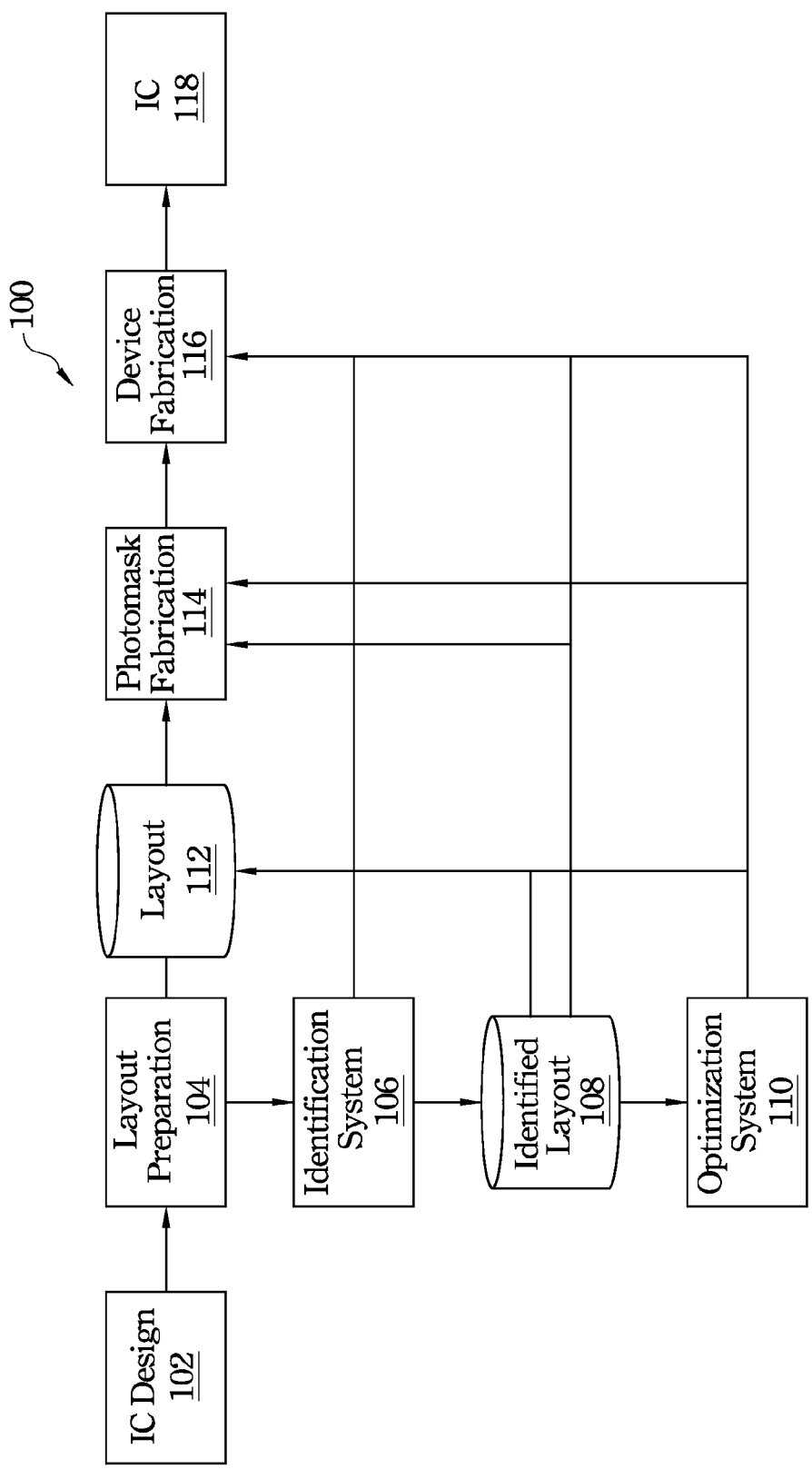
FIG. 1 is a block diagram of an embodiment of an integrated circuit (IC) design and fabrication system according to one or more aspects of the present disclosure.

FIG. 1 is a simplified block diagram of an embodiment of an integrated circuit (IC) design and fabrication system 100 and an IC design and fabrication flow associated with the IC design and fabrication system 100. The IC design 102 includes data defining an IC to be fabricated. The IC design 102 may be of an integrated circuit, or portion thereof, that may comprise static random access memory (SRAM) and/or other logic circuits, passive components such as resistors, capacitors, and inductors, and active components such as P-channel field effect transistors (PFET), N-channel FET (NFET), metal-oxide semiconductor field effect transistors (MOSFET), complementary metal-oxide semiconductor (CMOS) transistors, bipolar transistors, high voltage transistors, high frequency transistors, other memory cells, and combinations thereof.

The IC design 102 is provided to the IC layout preparation system 104. The IC design layout preparation 104 includes converting the IC design 102 to various geometrical patterns designed for an IC product, based on a specification of the IC product to be manufactured and the fabrication process to be used. The geometrical patterns correspond to patterns of metal, oxide, or semiconductor layers that make up the various components of the semiconductor device to be fabricated. The various layers combine to form various IC features. For example, a portion of the IC design layout 104 defines various IC features, such as an active region, gate electrode, source and drain, metal lines or vias of an inter-layer interconnection, and openings for bonding pads, to be formed in a semiconductor substrate (such as a silicon wafer) and various material layers disposed on the semiconductor substrate. The design procedure of blocks 102 and/or 104 may include suitable logic design, physical design, and/or place and route methods that are followed by verification techniques such as design rule checks (DRC), layout-versus-schematic (LVS) and/or other verifications.

After the preparation of the initial layout, the initial layout is provided to an identification system 106. The initial layout may be a layout that has passed all verification checks such as DRC, LVS, etc. The identification system 106 identifies portions of one or more features (e.g., polygons) of the initial layout provided by the layout preparation 104. The identification of a portion may be based on the criticality of the image of the identified portion. In other words, the identification may be performed on portions where a desire for an increased fidelity between the as-drawn feature and the as-imaged feature is present. For example, a portion that is more critical to the design of the semiconductor device may be desired to be more accurately imaged onto a target substrate and thus, identified as such.

The identification may be performed by review and analysis by the identification system 106 of the surrounding environment of the feature including features formed on other layers of the layout (e.g., including those features that will intersect or otherwise interface with the identified portion or feature). One or more portions of each feature may be identified. In an embodiment, the identified portion is an edge of a feature. Other examples of portions of a feature that may be identified include a corner, a segment of an edge, a portion of a polygon, and/or other suitable portions of the layout. The identification may be made using an annotation such as a shape or note in another layer of the layout (e.g., unused for imaged features), a marker file, and/or other suitable identification techniques.

In an embodiment, the identification system 106 includes providing a ranking or classification in addition to the identification of the portion of a feature. In an embodiment, those identified with higher criticality are those requiring or desiring a greater fidelity to the layout as formed on the substrate. The identification may include assigning any number of ranks or classifications (also referred to herein as "class" or category) for the identified portions. The identification of the rank or classification may also be performed by providing an annotation in another layer of the layout (e.g., unused for imaged features), a marker file, and/or other suitable techniques.

In an embodiment, the identification system 106 further includes an assignment of one or image criteria to be used on the identified portion(s). The image criteria may include a depth of focus (DoF), an intensity log slope (ILS), a mask error enhanced factor (MEEF), a process variation (PV) band, an edge position error (EPE), and/or other suitable criteria (e.g., target) used in the imaging or photolithography process. In a further embodiment, a magnitude of a value of one or more of the image criteria may be determined for each identified portion. In an embodiment, the image criteria is assigned based upon the rank or classification of criticality, discussed above. The identification of the image criteria may be stored by providing an annotation in another layer of the layout (e.g., unused for imaged features), a marker file, and/or other suitable means.

Thus, a layout, an identified layout 108, is output from the identification system 106 that includes an identification of one or more portions of at least one feature of the layout. The identified layout 108 may include an identification of the portion, a classification or rank of criticality of the identified portion, and/or an identification of an image criteria associated with the identified portion. This identified layout 108 may be presented in one or more data files having information of the geometrical patterns with suitable annotations. For example, the IC design layout can be expressed in a GDSII file format (or DFII file format).

The identified layout 108 is then delivered to an optimization system 110. The optimization system 110 is operable to determine lithography optimization parameters, which may be used to fabricate the photomask and/or perform the lithography process for the device associated with the layout 108. The optimization system 110 may include simulations, rule-based optical proximity correction (OPC), model-based OPC, and/or other suitable instructions for determining a lithography parameter. Exemplary lithography optimization parameters determined by the optimization system 110 include, but are not limited to: a radiation source parameter (e.g., wavelength, shape, intensity, field), a polarization parameter, a pupil parameter, a parameter of a knob of a lens system of a lithography tool, a Zernike term parameter, an off-axis illumination parameter, a numerical aperture (NA) parameter, a wave front modification parameter, a wavelength, resolution enhancement techniques (RET), and/or other parameters defining the fidelity of the image projected onto a semiconductor substrate. The RET techniques may include including optical proximity correction (OPC), assistant features such as scattering bars, serifs, hammerheads, modifying the shape of a feature of the layout, modifying the placement of a feature of the layout, modifying the size of a feature of the layout, adding dummy features to a layout, providing sub-resolution features to a layout or photomask, and/or other suitable practices.

The optimization system 110 determines the lithography optimization parameters for the identified portion of a feature of the layout. In an embodiment, optimization system 110 determines the lithography optimization parameters for the identified portion of a feature of the layout based on the rank or classification of the identified portions. In an embodiment, the optimization system 110 determines the lithography optimization parameters for the identified portion of a feature of the layout using the provided image criteria for the identified portion. For example, an identified portion may be optimized requiring different image criteria and thus, a different lithography optimization parameter(s) may be determined for one or more identified portions.

The optimization system 110 may output the determined lithography optimization parameters to provide a modified layout 112. For example, the determined lithography optimization parameters may include RET features that are performed on or added to the layout to provide a modified layout 112. The optimization system 110 may also or alternatively output the determined lithography optimization parameters to a photomask fabrication system 114. For example, the determined lithography optimization parameters may include RET features that are added during photomask fabrication 114.

In an embodiment, the determined lithography optimization parameters exhibit asymmetry with respect to the layout. For example, RET features may be placed such that one portion of a feature is imaged differently than another portion of a feature. As but one example of lithography optimization parameters exhibiting asymmetry, scattering bars may be placed adjacent one edge (e.g., an identified edge) of a symmetrical polygon feature (e.g., rectangle) while no scattering bar is placed adjacent the opposing edge. Generally, lithography optimization parameters that exhibit asymmetry are any features applied differently to one portion of a symmetric feature than they are applied to the region of the feature that is the mirror image of that identified portion. In other words, applying lithography optimization parameters exhibit asymmetry may result in a symmetric feature of a layout to be formed on a formed on a photomask and/or as imaged on a substrate as an asymmetrical feature.

It is also noted that the identified layout 108 may be provided to provide the modified layout 112 directly. For example, for identification that is not required to implement the lithography optimization parameters. It is also noted that the identified layout 108 may be provided to the photomask fabrication system 114 directly. One exemplary use would be the photomask fabrication system 114 using the identified layout 108 (or modified layout 112 including the identified layout 108 annotations) to perform its photomask inspection process(es). For example, the quality or quantity of inspections performed may be determined based on whether a region of the photomask includes identified portions of features. In an embodiment, a classification provided by the identified layout 108 determines an inspection plan for a region of the photomask. As another example, disposition of a defect in a photomask (e.g., whether to scrap, rework or proceed with the defect) may be determined based on whether a defect is provided in a region of the photomask that includes identified portions of features. In an embodiment, a classification identified by the identified layout 108 determines a disposition plan for a defect in the photomask.

It is also noted that the identified layout 108 may be provided to the device fabrication system 116 directly. For example, in some embodiments, a photomask is not used to fabricate the semiconductor device, such as, in a direct e-beam write process. Thus, the identified layout 108 may be provided to a lithography tool such as an e-beam writer.

Returning to the optimization system 110, the optimization system 110 may output the determined lithography optimization parameters to a device fabrication system 116 including a tool such as a lithography tool. For example, the determined lithography optimization parameters may include lithography parameters such as recipe settings for performing the irradiation of a photomask containing the layout 112. Exemplary determined lithography optimization parameters may include a radiation source parameter (e.g., wavelength, shape, intensity, field), a polarization parameter, a pupil parameter, a parameter of a knob of a lens system of a lithography tool, a Zernike term parameter, an off-axis illumination parameter, a numerical aperture (NA) parameter, a wavelength, and/or other settings for a lithography process. The device fabrication system 116 receiving the lithography optimization parameter may include a stepper, a scanner, an immersion lithography tool, a contact lithography tool, a deep UV or extreme UV lithography tool, and/or other suitable tools known in the art. In an embodiment, the optimization system 110 outputs the determined lithography optimization parameters to the device fabrication system 116 including a tool such as an e-beam writer (e.g., direct writing without the use of a photomask).

In an embodiment, a lithography optimization parameter provided by the optimization system 110 may exhibit asymmetry with respect to a symmetrical feature of a layout. For example, lithography optimization parameter may be applied to a lithography process such that one portion of a feature is imaged differently than another portion of a feature. Generally, lithography optimization parameters that exhibit asymmetry are any features applied differently to one portion of a symmetric feature than they are applied to feature at the mirror image of that portion. In other words, applying lithography optimization parameters exhibit asymmetry may result in a symmetric feature of a layout to be imaged on a substrate as an asymmetrical feature.

The system 100 ends with providing an integrated circuit (IC) 118. The IC 118 is defined by the IC design 102 and the layout 112. The IC 118 is fabricating using the device fabrication system 116 including the lithography optimization parameters determined by the optimization system 110. As described above, in an embodiment a feature of the IC 118 is an asymmetric feature, while the corresponding feature of the layout 104 and/or 112 as-drawn is a symmetric feature. For example, in an embodiment, one edge of a symmetrical rectangle is imaged differently such that the edge and its opposing edge are no longer mirror-images on the as-printed feature.

Figure 2:
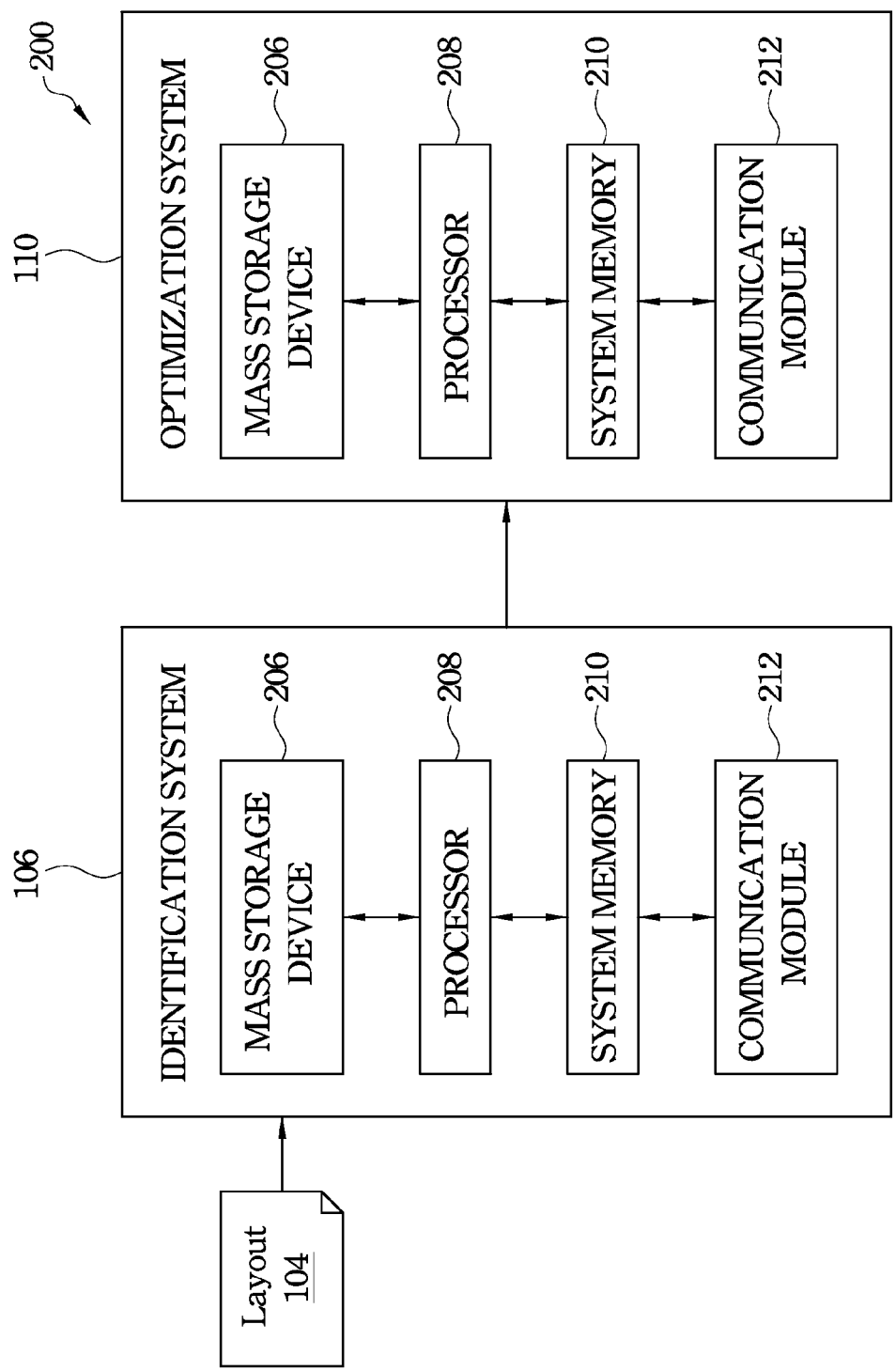
FIG. 2 is detailed block diagram of portions of the system of FIG. 1, according to one or more aspects of the present disclosure.

Referring now to FIG. 2, illustrated are aspects of the design and fabrication system 100 of FIG. 1, in greater detail. Specifically illustrated is the layout 104 being provided to the identification system 106 and then the optimization system 110. It is noted that while these systems 106 and 110 are illustrated separately, they may be the same system. The identification system 106 is an information handling system such as a computer, server, workstation, or other suitable device. The system 106 includes a processor 208 that is communicatively coupled to a system memory 210, a mass storage device 206, and a communication module 212. The system memory 210 provides the processor 208 with non-transitory, computer-readable storage to facilitate execution of computer instructions by the processor. Examples of system memory 210 may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 206. Examples of mass storage devices 206 may include hard discs, optical disks, magneto-optical discs, solid-state storage devices, and/or a variety other mass storage devices known in the art. The communication module 212 is operable to communicate information such as modifying stored IC design layout files with the other components in the IC manufacturing system. The communication module 212 is also operable to communicate information such as process parameters with other components of the IC manufacturing systems such as photomask fabrication systems and lithography tools. Exemplary lithography tools include steppers, scanners, immersion lithography tools, e-beam writers, and the like. The communication module 212 is also operable to receive user input into the identification system 106. For example, user input on image criteria may be received and/or stored by the identification system 106.

The optimization system 110 is also an information handling system such as a computer, server, workstation, or other suitable device. The system 110 may be separate from or included in the system 106. The system 110 includes a processor 208 that is communicatively coupled to a system memory 210, a mass storage device 206, and a communication module 212. The system memory 210 provides the processor 208 with non-transitory, computer-readable storage to facilitate execution of computer instructions by the processor. Examples of system memory 210 may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 206. Examples of mass storage devices 206 may include hard discs, optical disks, magneto-optical discs, solid-state storage devices, and/or a variety other mass storage devices known in the art. The communication module 212 is operable to communicate information such as modifications to stored IC design layout files with the other components in the IC manufacturing system. The communication module 212 is also operable to communicate information such as process parameters with other components of the IC manufacturing systems such as photomask fabrication systems and lithography tools. Exemplary lithography tools include steppers, scanners, immersion lithography tools, e-beam writers, and the like.

In an embodiment, each of the identification system 106 and the optimization system 110 include software instructions for performing the operations discussed above with reference to FIG. 1. For example, the identification system 106 may include instructions for identifying one or more portions of a feature or features of a layout, instructions for assigning a rank or classification to the identified portion(s), and/or instructions for assigning or receiving user input for image criteria to be applied to the identified portion(s) of the layout. The optimization system 110 may receive output from the identification system 106 such as, an identified feature or features of a layout, an assigned rank or classification of the identified feature or features, and/or an image criteria for an identified feature or features of the layout. Using these inputs the optimization system may utilize instructions such as model-based analysis, rule-based analysis, look-up tables, simulations, and/or other suitable instructions to generate optimized lithography parameters.

Figure 3:
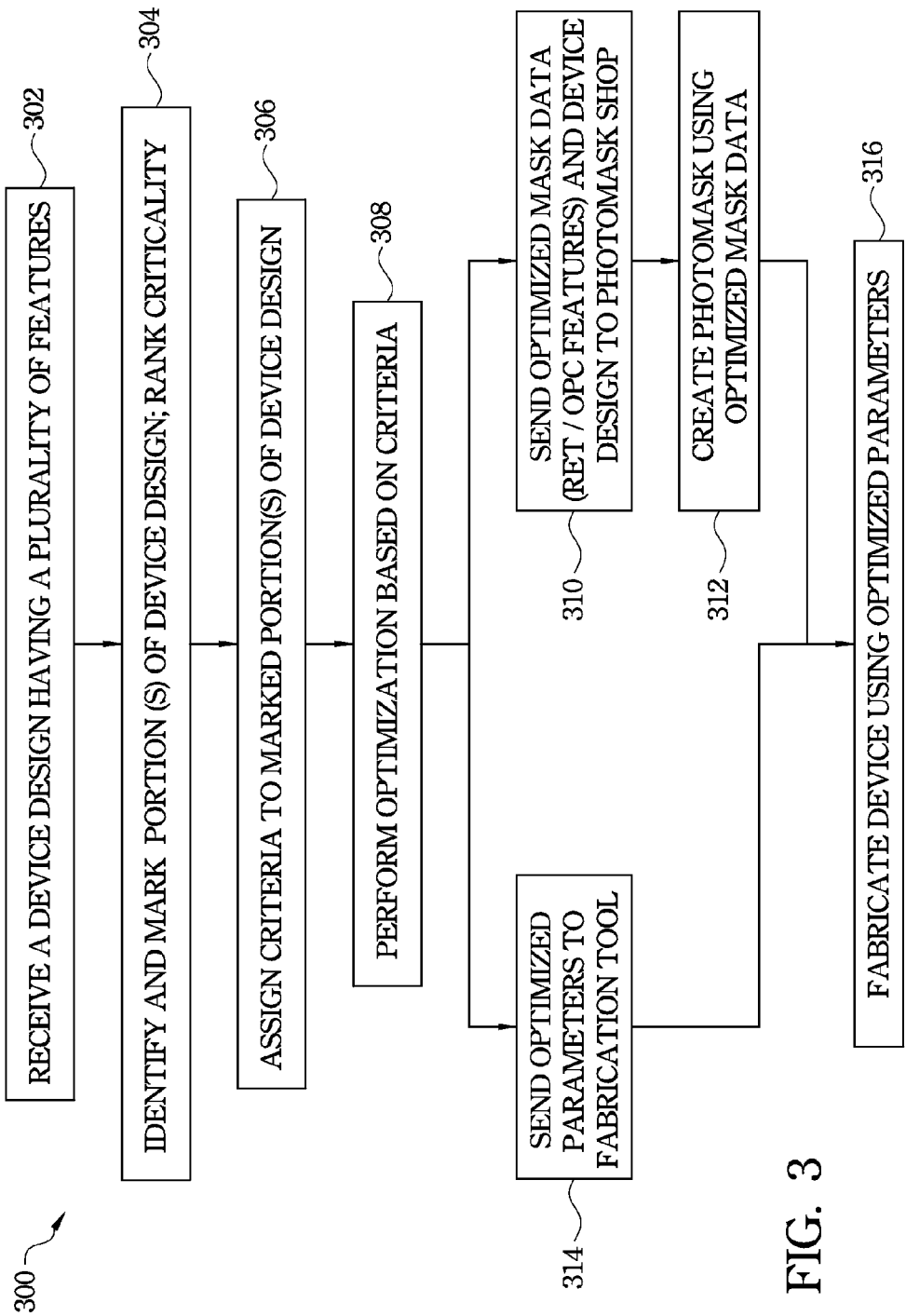
FIG. 3 is a flow chart of an embodiment of a method of designing and fabricating a semiconductor device according to one or more aspects of the present disclosure.

Referring now to FIG. 3, illustrated is a method 300 of designing and fabricating a semiconductor device such as an IC device. The method 300 may be implemented using the system 100 and/or the system 200 described above with reference to FIGS. 1 and 2, respectively.

The method 300 begins at block 302 where a device design having a plurality of features is provided. In an embodiment, the device design is a layout form. The layout may include a plurality of polygons representing the design of the device. In an embodiment, the layout is a GDSII file and/or other suitable format such as DFII, CIF, OASIS and the like.

The device may include an integrated circuit, or portion thereof, that may comprise static random access memory (SRAM) and/or other logic circuits, passive components such as resistors, capacitors, and inductors, and active components such as P-channel field effect transistors (PFET), N-channel FET (NFET), metal-oxide semiconductor field effect transistors (MOSFET), complementary metal-oxide semiconductor (CMOS) transistors, bipolar transistors, high voltage transistors, high frequency transistors, other memory cells, and combinations thereof. The device design can define main IC features such as active regions, gate electrodes, sources and drains, metal lines, interlayer interconnection vias, and openings for bonding pads that may be formed in a semiconductor substrate (such as a silicon wafer) and various material layers to be disposed over a semiconductor substrate.

Figure 4:
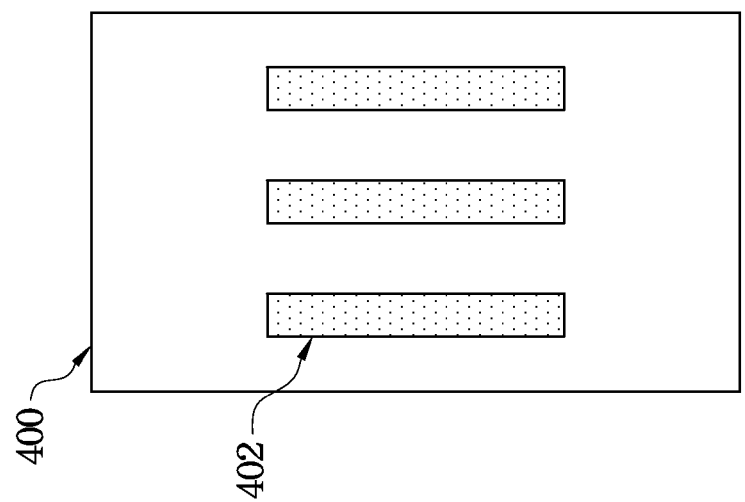

Referring to the example of FIG. 4, illustrated is a layout 400 including a plurality of features 402. The features 402 are illustrative in shape, quantity and configuration, and not intended to be limiting. In an embodiment, the features 402 define mandrels used to fabricate a fin-type field effect transistor. Other types of features include interconnect structures such as conductive lines and/or vias, gate structures, contacts, doped regions, isolation structures, and/or other suitable features of a semiconductor device. It is noted that the features 402 are each symmetrical.

The method 300 then proceeds to block 304 where one or more portions of the device design (e.g., layout) is identified and marked. Block 304 may be performed by an identification system substantially similar to the identification system 106, described above with reference to FIGS. 1 and 2. The identification of the portion of the device design may be performed based on the criticality of the portion of the design. For example, the identified portion may benefit from increased fidelity between its imaged and as-drawn feature due to a small overlay offset margin with an adjacent feature. In an embodiment, a portion of a feature is identified and marked. The portion may include an edge, a portion of an edge, a part of a polygon, a corner, and/or other suitable feature. In an embodiment, the portion identified is one portion (e.g., edge, corner) of a symmetrical feature. The mirror-image of that portion in the feature may not be identified. The identification may be provided by annotating the layout file, using a marker file, providing a shape or text annotation in an unused layer of the layout file, and/or other suitable methods.

Figure 5:
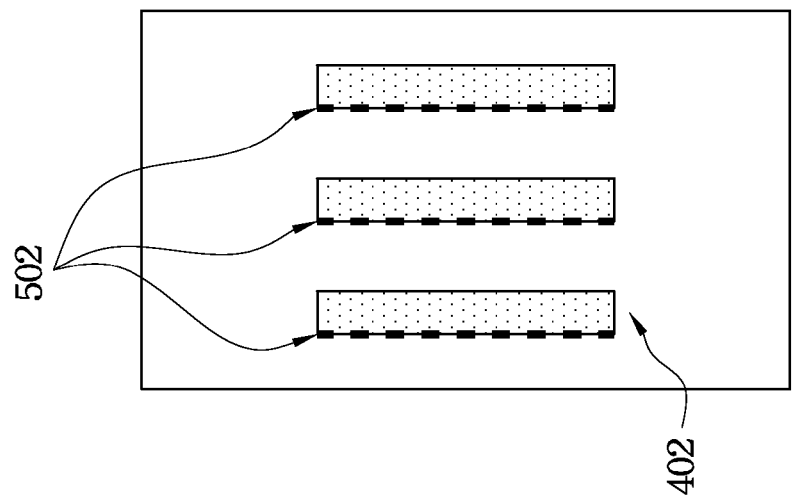
FIGS. 4-8 illustrate top views of embodiments of a layout of a semiconductor device according to one or more steps of the method of FIG. 3.
Figure 8:
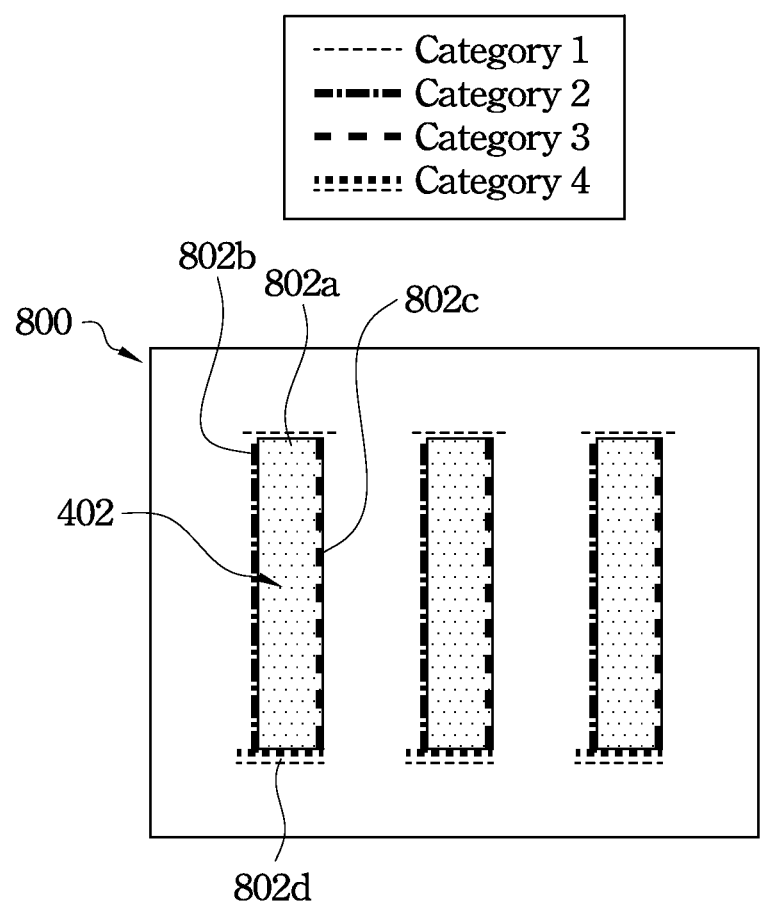

Referring to the example of FIG. 5, a portion of each of the features 402 are identified (depicted as a dashed-line for reference purposes only). The portion identified is an edge 502. As illustrated, one edge 502 is identified for each of the features 402, however this is not required. Some features may have no portions identified or different portions identified. Further, more than one portion of a given feature may be identified. For example, the exemplary layout of FIG. 8 illustrates the features 402 each having a plurality of portions identified. Specifically, each edge of the features 402 is separately identified 802a, 802b, 802c, and 802d.

In an embodiment, block 304 of the method 300 includes ranking or classifying a criticality of the identified portion(s). This classification may be substantially similar to as discussed above with reference to identification system 106. In other embodiments, the ranking or classification is omitted. Referring to the example of FIG. 8, each of 802a, 802b, 802c, and 802d represent a different category (see key). The ranking or classification may be based on the criticality of the portion of the feature. For example, 802a may be more critical than 802b, which may be more critical than 802c, which may be more critical than 802d. In an embodiment, "more critical" indicates a desire to have greater fidelity between an as-drawn feature and its as-printed equivalent. Any plurality of classifications or rankings may be applied and any number of portions of a feature may be determined to be a given classification or rank.

The identification and/or classification or rank of a portion of the feature may be determined by analysis of surrounding environment of the feature in the layout (including features on the same or other layers of the layout surrounding the feature having the portion identified). The identification and/or classification or rank of a portion of the feature may be determined by analysis of fabrication data and/or design data (including characterization, simulation of the design) associated with the feature. The identification and/or classification or rank of a portion of the feature may be determined by user input for example, designer's determination of a criticality of the portion of the feature based on design data.

The method 300 then proceeds to block 306 where an image criteria may be assigned for any or all features of the layout. In an embodiment, an image criteria is assigned for each identified or marked portion of the device design. In a further embodiment, a plurality of baseline image criteria for the device design may be determined. In an embodiment, this baseline is based on, for example, the technology node to be used. In a further embodiment, in block 306, specific image criteria which may deviate from this baseline image criteria are assigned for the identified portion(s). Exemplary image criteria include depth of focus (DoF), intensity log slope (ILS), mask error enhanced factor (MEEF), process variation (PV) band, edge position error (EPE), and/or other suitable criteria. In an embodiment, in block 306 a value or magnitude of a value for one or more of the image criteria previously mentioned is determined for the identified portion(s). The value may be set by a user, determined by simulation, determined from a look-up table, characterization data, and/or other suitable methods.

Thus, a feature of a design (e.g., layout) may have one or more portions identified, ranked, and/or specific image criteria for that portion specified. In an embodiment, the feature of the design is a symmetric feature and a portion of the symmetric feature is identified and image criteria assigned in an asymmetric manner. For example, one edge or corner of a symmetric feature is identified and criteria assigned, while the mirror-image of that edge or corner is either not identified or differently identified (e.g., ranked) such that a different image criteria value is applied to that mirror-image portion.

In an embodiment, a first MEEF value is assigned for a first identified portion and a second MEEF value is assigned for a second identified portion. In an embodiment, a first ILS value is assigned for a first identified portion and a second ILS is assigned for a second identified portion and so on. As a further example, with reference to FIG. 8, Category 1 may assign a first MEEF value, Category 2 a second MEEF value, Category 3 a first ILS value and Category 4 a second ILS value. For example, a first MEEF value may be less than approximately 4; a second MEEF value may be less than approximately 5; a first ILS value may be greater than approximately 35; a second ILS value may be greater than approximately 25. These categories, image criteria, and values are by way of example only and not intended to be limiting the present disclosure to these image criteria or these values.

The method 300 then proceeds to block 308 where an optimization is performed based on the image criteria provided in block 306. The optimization may be performed using an optimization system substantially similar to the optimization system 110, described above with reference to FIGS. 1 and 2. The optimization system may use various means such as simulations, characterization, parametric data, look-up tables and the like to determine lithography (referred to herein as optimized lithography parameters or lithography optimization parameters) that are to be used to achieve the image criteria identified above in block 306.

As described above, the lithography optimization parameters determined in block 308 may include RET features that are performed on the layout. The RET features may include adjustments or additions to a layout file and/or adjustments or additions to photomask fabrication data associated with the layout file. For example, the determined lithography optimization parameters may include RET features such as serifs, scattering bars, hammerheads, and/or other features including OPC features that are added to the layout before or during photomask fabrication.

As also described above, the lithography optimization parameters determined in block 308 may include instructions directed to the use of a device fabrication tool such as a lithography tool. For example, the determined lithography optimization parameters may include lithography parameters such as recipe settings for performing the irradiation of the photomask describing the device design provided in block 302. For example, the determined lithography optimization parameters may include a radiation source parameter (e.g., wavelength, shape, intensity, field), a polarization parameter, a pupil parameter, a parameter of a knob of a lens system of a lithography tool, a Zernike term parameter, an off-axis illumination parameter, a numerical aperture (NA) parameter, a wave front modification parameter, a wavelength, and/or other settings for a lithography process.

Thus, optimized lithography parameters for a device design are determined that may include different parameters for an identified portion than another portion of a layout or even another portion of the feature having the identified portion. In an embodiment, the feature of the design is a symmetric feature and a portion of the symmetric feature is identified and optimized lithography parameters provided in an asymmetric manner. For example, one edge or corner of a symmetric feature is identified and optimized lithography parameters determined, while the mirror-image of that edge or corner is either not identified or differently identified (e.g., ranked) such that a different lithography parameter is applied to that mirror-image portion.

In an embodiment of the method 300, the optimized lithography parameters determined in block 308 are provided to a fabrication tool, as described in block 314. For example, the determined lithography optimization parameters may include a radiation source parameter (e.g., wavelength, shape, intensity, field), a polarization parameter, a pupil parameter, a parameter of a knob of a lens system of a lithography tool, a Zernike term parameter, an off-axis illumination parameter, a numerical aperture (NA) parameter, a wave front modification parameter, a wavelength, and/or other settings for a lithography process, and/or other settings for a lithography process. These parameters may be sent to a fabrication tool for storage (e.g., as a recipe) and use during the fabrication process of the device.

In an embodiment of the method 300, the optimized lithography parameters determined in block 308 are provided to a photomask fabrication system or photomask shop, as described in block 310. For example, optimized lithography parameters such as RET features or modifications to a layout determined by the optimization may be provided to the photomask fabrication system.

The method 300 then proceeds to block 312 where a mask or group of masks is fabricated based on the device design and optimized lithography parameters. For example, an electron-beam (e-beam) or a mechanism of multiple e-beams is used to form a pattern on a mask (photomask or reticle) based on device design and lithography parameters (e.g., RET features). The mask can be formed in various technologies. In one embodiment, the mask is formed using binary technology. In the present embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art.

Figure 6:
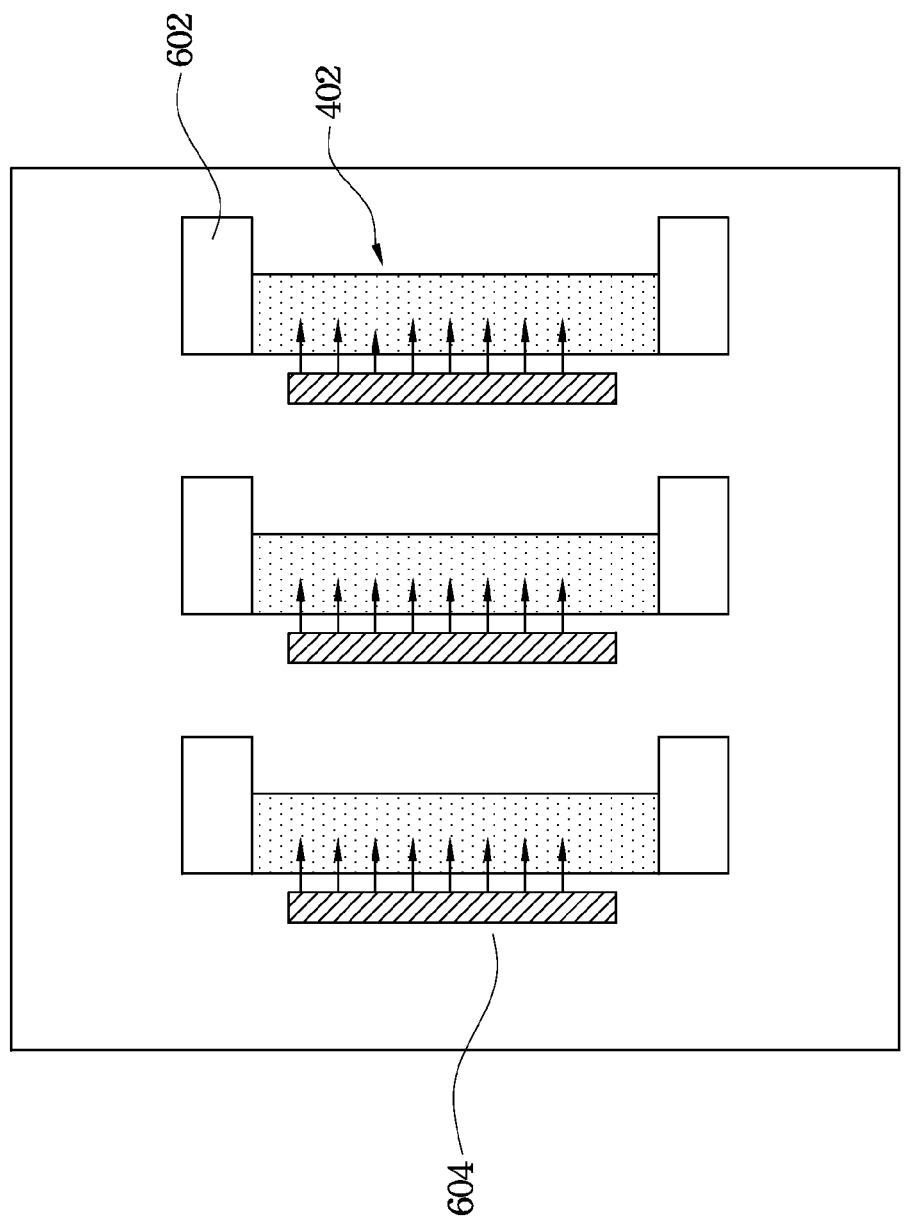

Referring to the example of FIG. 6, an optimized lithography parameter determined provides for a scattering bar 604 to be placed adjacent an identified portion (e.g., edge 502 of FIG. 5). The scattering bar 604 is associated with (e.g., impacts the imaging of) the identified portion of the features 402. It is noted that the scattering bars 604 are applied in an asymmetric manner imaging one edge of a symmetric feature 402 and not the opposing edge. Similarly, FIG. 6 illustrates an optical proximity correction (OPC) feature 602 (e.g., hammerhead) applied to the features 402. The OPC feature 602 is also applied in an asymmetric manner for each feature 402.

The method 300 then continues block 318 where the device defined by the device design provided in block 302 is fabricated. The device may be fabricated using a complementary metal-oxide-semiconductor (CMOS) technology process flow as known in the art. Thus, additional details of the fabrication are not required herein but well understood by one or ordinary skill in the art. The fabrication is performed using a photomask defined by the lithography optimization parameters of block 308 and using fabrication process parameters defined by the lithography optimization parameters of block 308.

Figure 7A:
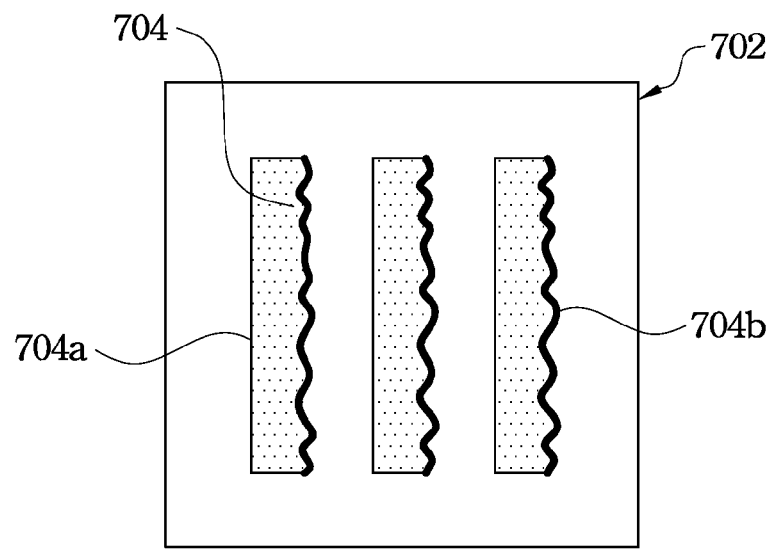
Figure 7B:
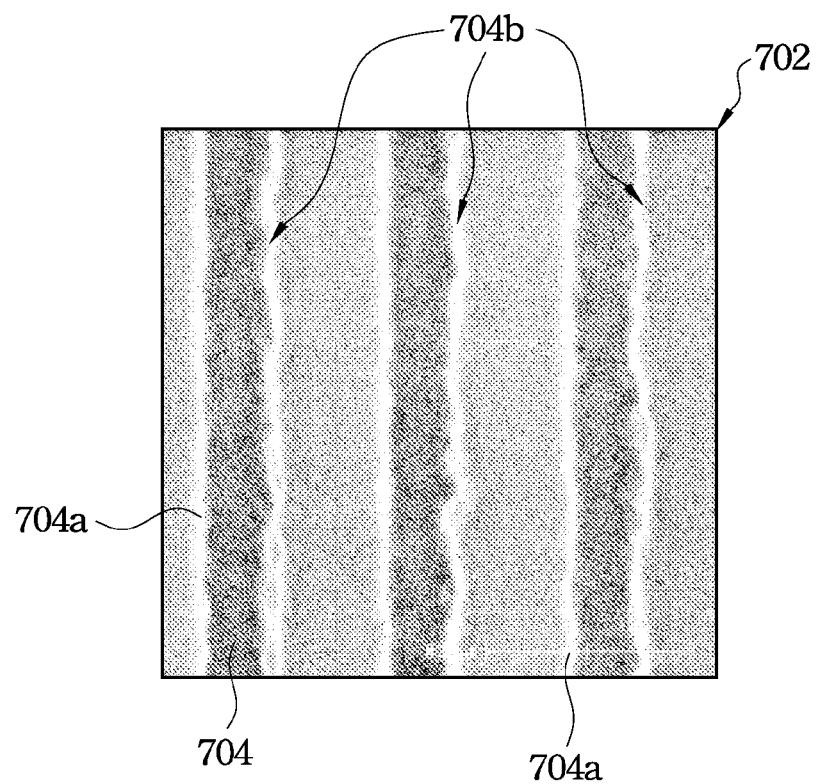

Referring to the example of FIGS. 7A and 7B, illustrated is a semiconductor substrate 702 having features 704 formed thereon. The substrate 702 may be a silicon substrate. Alternatively, the substrate 702 may comprise another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof.

The features 704 are defined by the features 402 of the layout 400 as modified by the RET features 602 and 604 (illustrated in FIG. 6). As illustrated each of the FIG. 704 is asymmetric. The feature 704 has a first edge 704a, which was identified in the layout, as illustrated in FIG. 5. Thus, the first edge 704a was imaged using optimized lithography parameters (see FIG. 6). The feature 704 has a second edge 704b, which was not so identified. Thus, edge 704a as printed is different than edge 704b making the feature 704 asymmetrical. FIG. 7B illustrates a scanning electron microscope (SEM) view of the substrate 702 and features 704.

In an embodiment, the features 704 are polysilicon such as, for example, defining a gate structure. Alternatively, the features 704 may be a conductive material, such as copper or aluminum typically used in interconnect fabrication; semiconductor material such as a raised portion (fin) of the substrate, a sacrificial material (e.g., mandrel in a finFET process), insulating material such as defining an isolation structure, and/or other suitable materials.

In an embodiment, the edge 704a is subsequently used to align, interface with or otherwise interact with another feature to be formed on the substrate 702. The improved fidelity of the edge 704a to the layout (see FIG. 4) may provide for an improved overlay error tolerance or structural integrity of the second feature. In one embodiment, the second edge 704b is not subsequently used to define or otherwise interface with another feature and thus, its criticality is less than that of the first edge 704b. Therefore, by providing a lower criteria for its imaging, efficiency may be increased without substantial impact to the overall device. For example, in an embodiment, the features 704 have a different PV band on edge 704a in comparison with edge 704b (e.g., different image criteria applied).

As illustrated, each of the features 704 formed on the substrate is asymmetric. In an embodiment, a device has a feature with an edge (e.g., edge of metal line), or portion thereof, that is close to a via landing. The device feature may be asymmetric as it has one side or edge with a lower line edge roughness (LER) as compared to its other side. In a further embodiment, the asymmetric feature has one portion of an edge with a lower line edge roughness (LER) as compared to its other edge. Thus, a device may be provided having a feature that has an asymmetric attribute such as LER. LER may be the deviation of a line edge from a straight line.

Referring now to FIGS. 9 through 17, illustrated is an embodiment of applying the system 100 and/or 200 of FIGS. 1 and 2 respectively and/or one or more blocks of the method 300, described above with reference to FIG. 3. FIGS. 9-17 are illustrative of a finFET process; however, this process is exemplary and not intended to be limiting beyond any specific recitation in the claims following this discussion.

Figure 9:
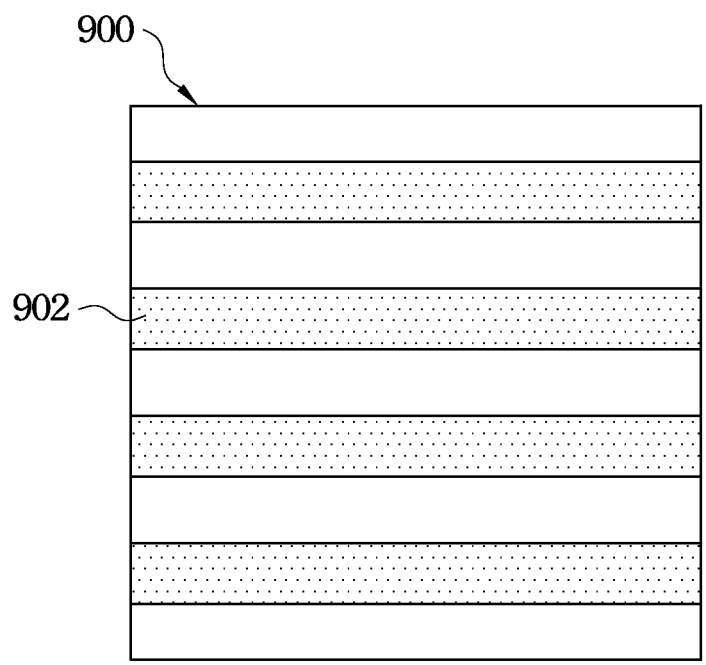
FIGS. 9-13 illustrate top views of a typical fin-type field effect transistor (FinFET) device layout and fabrication sequence.
Figure 10:
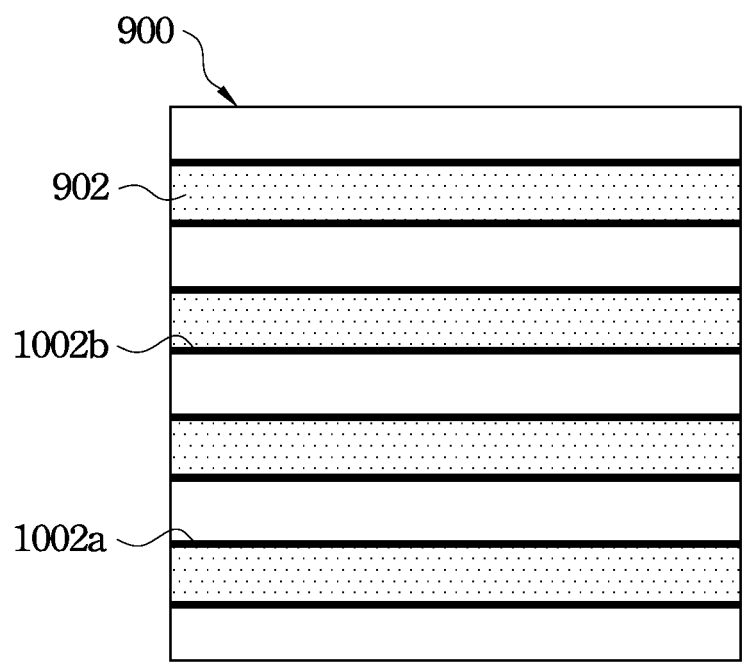
Figure 11:
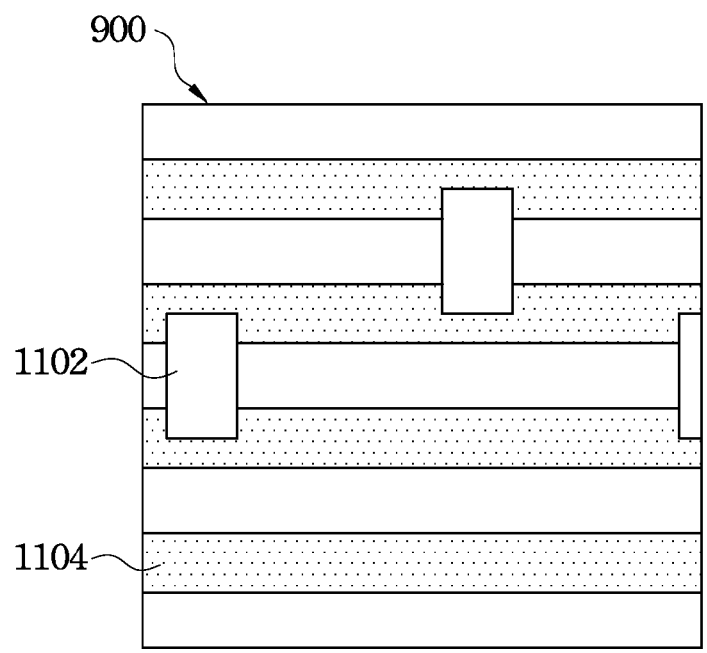
Figure 12:
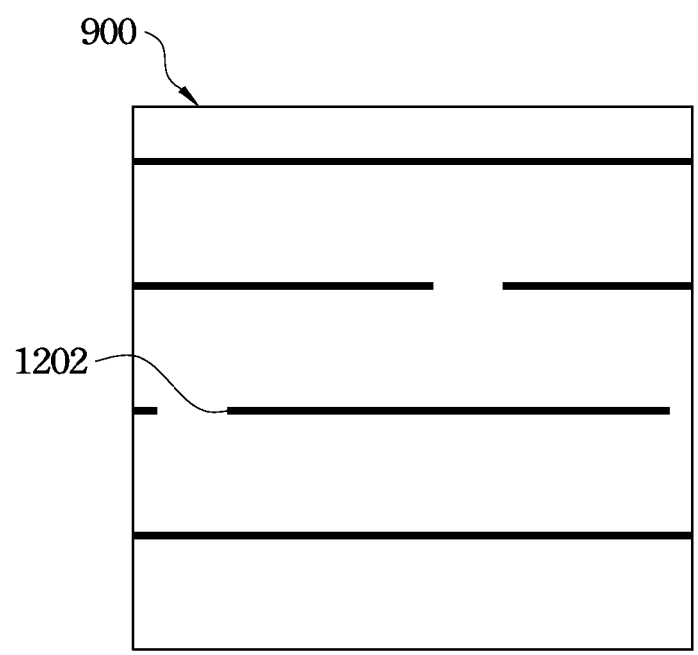
Figure 13:
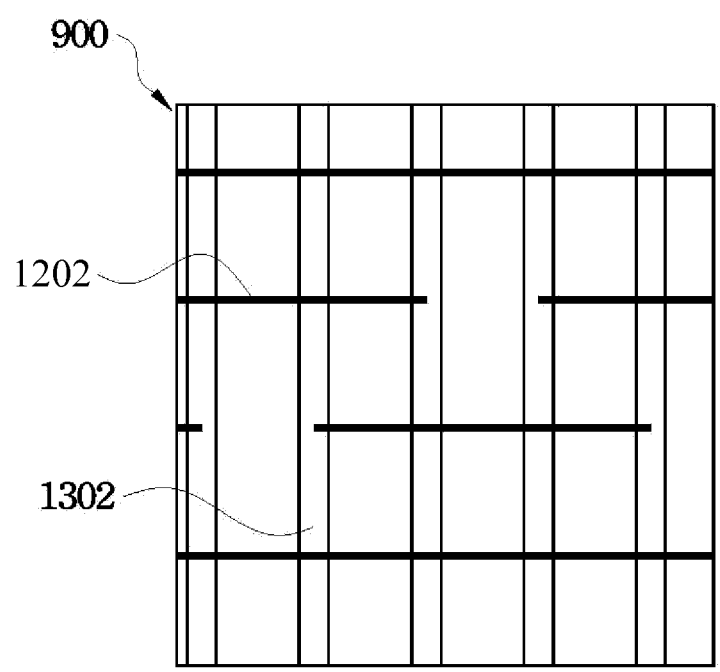

FIGS. 9-13 illustrate an exemplary process typically applied during the fabrication of finFET devices. While the term layout is used describe these figures in the present description, it is noted that not all of the illustrated features may be defined by polygons in a layout (e.g., they may be fabricated on a substrate). FIG. 9 illustrates a layout 900 including a plurality of features 902. The features 902 may be mandrels (e.g., sacrificial features) used to define a fin of a finFET device. Continuing to FIG. 10, illustrated is the layout 900 having a subsequent process step identified, namely the formation of elements 1002 on the sidewalls of the features 902. The elements 1002 are formed on the sidewalls of the features (e.g., mandrels) 902. Specifically, an element on a top edge of the features 902 is denoted 1002a and an element on the bottom edge (sidewall) of the feature 902 is denoted 1002b. In an embodiment, the elements 1002a define fins of a finFET device. FIG. 11 illustrates yet another subsequent process step in the flow of forming the device of layout 900, a cut process defined by cut layer 1102 and 1104 that allows for the removal of the elements 902 and portions of elements 1002 from a substrate. Cut layer 1102 defines the regions where the element 1002a (formed on a top edge of the element 902) is removed. In the other regions, the element 1002a remains on the substrate. Elements 1002b are also removed by the cut process in their entirety. FIG. 12 illustrates the resultant configuration having fins 1202, which are fabricated from elements 1002a (FIG. 10). In FIG. 13, illustrated is the fins 1202 (active area (OD)) with a gate layer 1302 (e.g., used to fabricate a gate structure) overlaid. In an embodiment, the gate layer 1302 includes polysilicon lines.

This process depicted by FIGS. 9-13 is illustrative of one where a portion of a feature, such as feature 902, is more important or critical to the final device. In other words, a top edge (sidewall as fabricated) of the feature 902 defines the resultant fins 1202. However, the opposing bottom edge (sidewall as fabricated) of the feature 902 is not used to define a feature of the resultant device.

FIGS. 14-17 are illustrative of identifying portions of a feature of layout that may be used to specify different image criteria for certain (e.g., more critical) portion(s) of the feature. Specifically, FIGS. 14-17 are illustrative of the analysis that may be performed by an identification system such as the identification system 106, described above with reference to FIGS. 1 and 2 and/or as described with reference to block 304 of the method 300.

Figure 14:
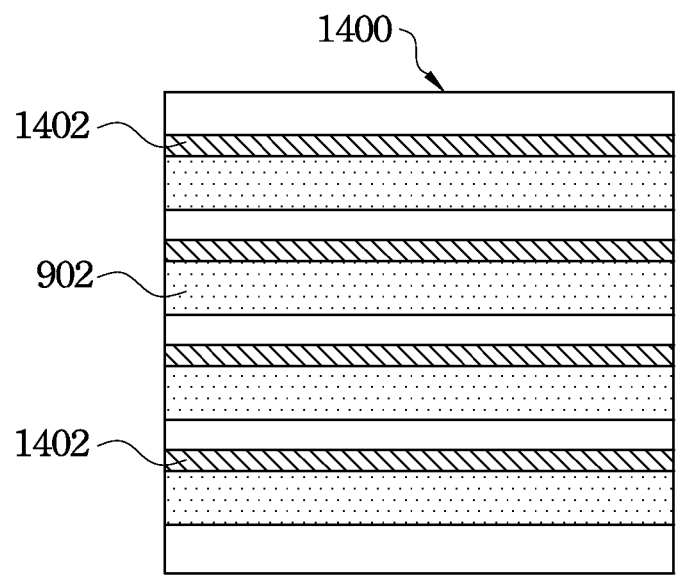
FIGS. 14-17 illustrate top views of an embodiment of a FinFET device design and fabrication according to one or more aspects of the present disclosure.
Figure 15:
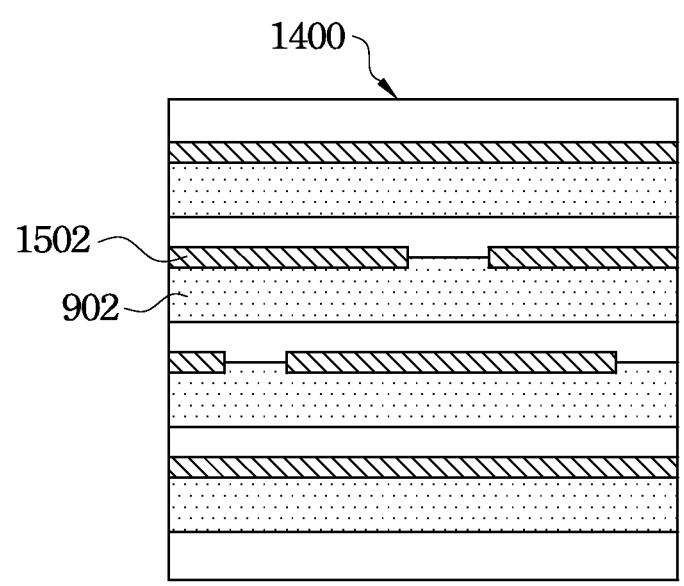

FIG. 14 illustrates a layout 1400 that may be substantially similar to the layout 900 except that it has a portion of the features 902 identified such as discussed above with reference to the identification system 106 of FIGS. 1 and 2 and block 304 of the method 300, described above with reference to FIG. 3. The identified portion is an edge 1402 of each of the features 902. As illustrated above, the edge 1402 is confined to a top (relatively speaking) edge of the feature 902 as the opposing edge is not used to define a feature of the as-fabricated device. While in some embodiments, this identification of the edge 1402 may be sufficient to implement imaging criteria and develop optimized lithography parameters, in other embodiments, further isolation of the portions that are to be treated with increased criticality or higher/greater image criteria is desired. For example, FIG. 15 is illustrative of the modification of the identification of the edge 1402 (FIG. 14) to that of segments of the edge 1502. Specifically, the cut process 1102 illustrated in FIG. 11 defines certain segments of the edge of the feature 902 that are not used to define a feature and thus, may have decreased criticality. These regions are removed from the identified edge portions.

Figure 16:
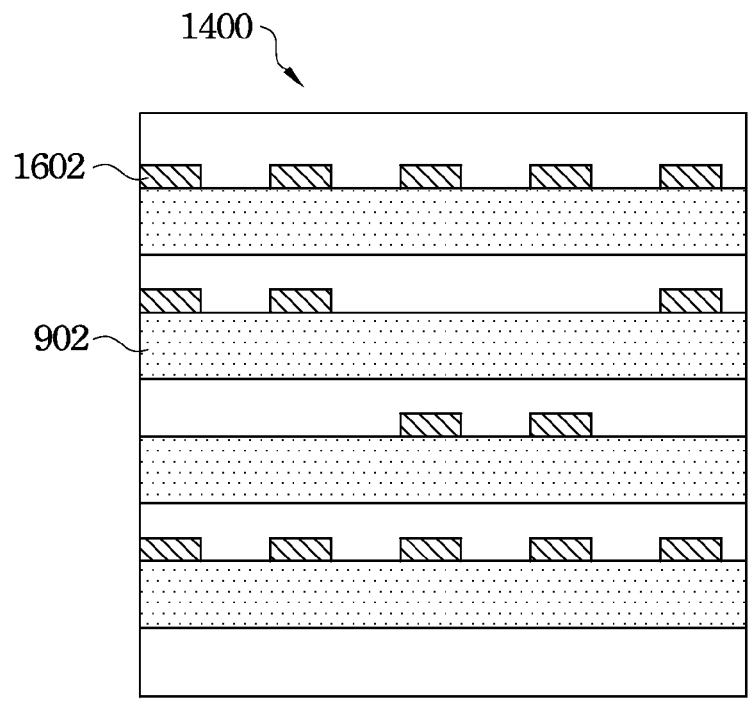

While in some embodiments, this identification of the segments 1502 may be sufficient to implement image criteria and develop optimized lithography parameters, in other embodiments, further isolation of the portions that are to be treated with increased criticality or higher image criteria is desired. For example, FIG. 16 is illustrative of the modification of the segments 1502 (FIG. 15) to that of segments 1602. Specifically, as illustrated in FIG. 13, the gate layer 1302 overlaps only certain segments of the fin. The fin at this gate region may be desired to be formed with increased image criteria to improve device reliability, yield, device quality, and manufacturing ease (e.g., alignment). Thus, the identified portions of the features 902 are modified with this knowledge. In other words, regions of the feature 902 not defining a region of a fin over which a gate layer will be formed, may not be identified. This leaves identified portions 1602 of the layout 1400 as illustrated in FIG. 16.

Figure 17:
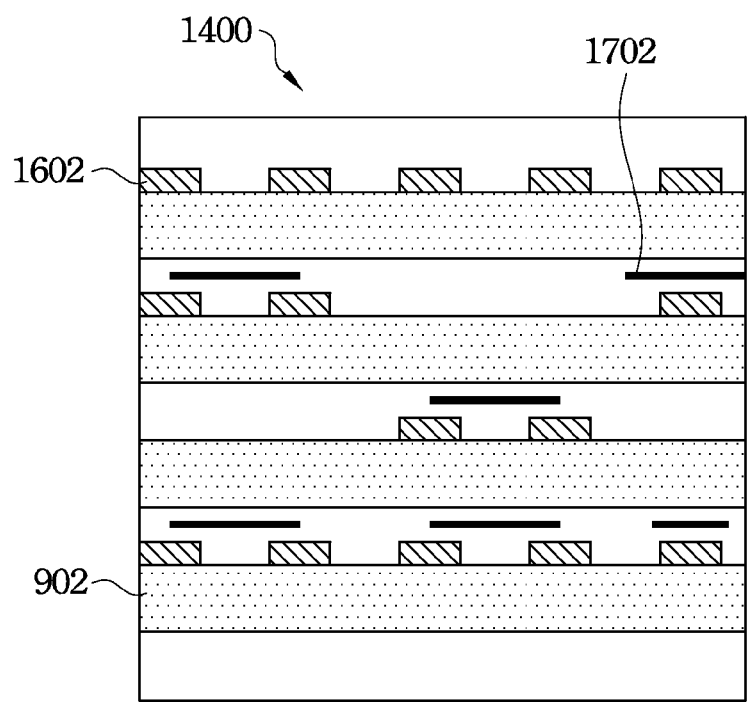

Finally, FIG. 17 illustrates the inclusion of scattering bars 1702, a lithography optimization parameter as discussed above, associated with the imaging of these identified portions 1602. The lithography parameter, scattering bar 1702, may be determined using the optimization system 110 described above with reference to FIGS. 1 and 2, and/or using block 308 of the method 300, described above with reference to FIG. 3.

Figure 18:
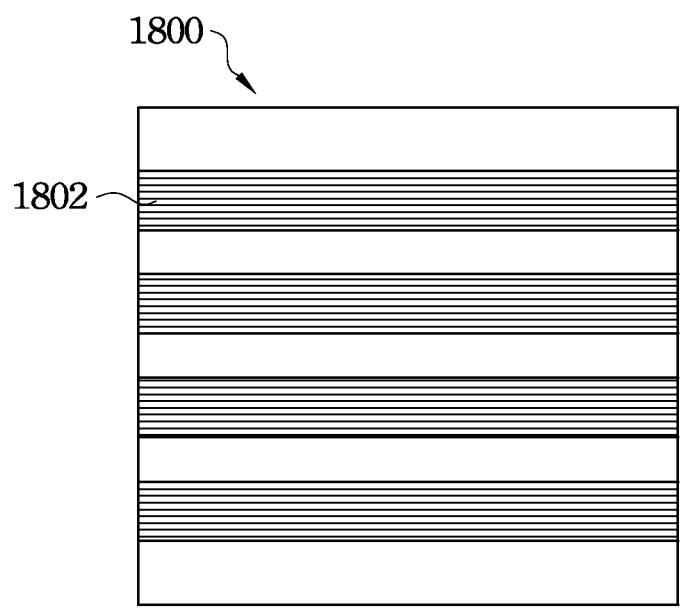
FIGS. 18-20 illustrate an embodiment of a semiconductor device design and fabrication according to one or more aspects of the present disclosure.
Figure 19:
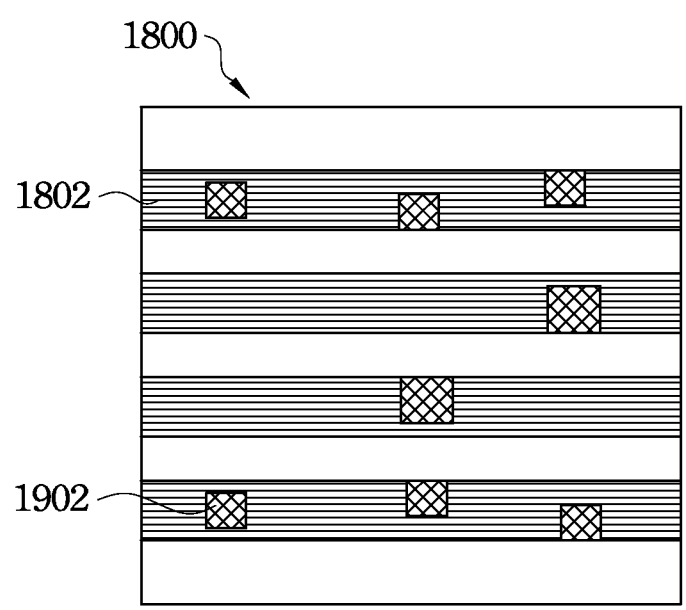
Figure 20:
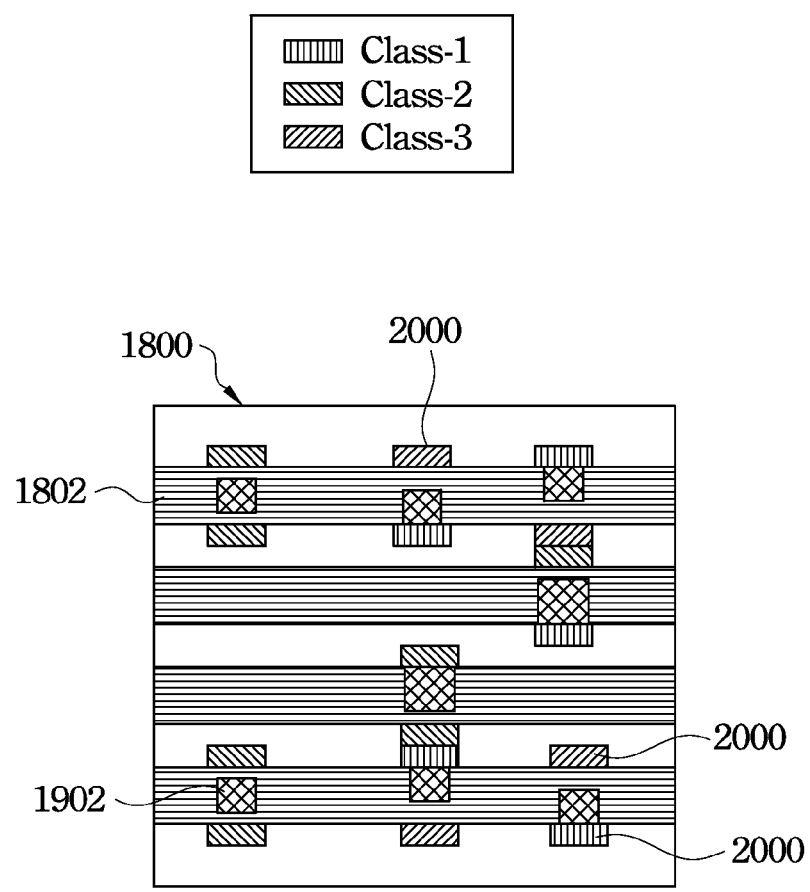

Referring now to FIGS. 18-21 illustrated is another exemplary application of the system 100, system 200 and/or method 300, described above with reference to FIGS. 1, 2, and 3 respectively. Specifically, FIGS. 18, 19 and 20 are illustrative of embodiments of blocks 302 and 304 of the method 300. FIG. 18 is illustrative of a layout 1800 including a plurality of features 1802. In an embodiment, the features 1802 are representative of conductive lines such as, metal lines of an interconnect structure or multi-layer interconnect (MLI). The features 1802 may be formed on a first layer of the layout 1800. FIG. 19 is illustrative of the layout 1800 including a second layer of the layout 1800, which has features 1902. In an embodiment, the features 1902 are representative of vias such as conductive vias providing a vertical interconnection between the features 1802 and other features (e.g., metal lines). It is important that the features 1902 land on the features 1802 to provide a suitable connection. As the technology nodes decrease and thus the feature size decrease, it may become more and more challenging to ensure this alignment.

FIG. 20 is illustrative of an embodiment of the output of an identification system such as the identification system 106 of FIGS. 1 and 2, and/or representative of an example of block 304 of the method 300 of FIG. 3. Portions of the features 1802 are identified, denoted as 2000. The identification of the portions 2000 may be determined by the analysis of the features 1902 to determine the portions of the features 1802 on and adjacent the intersection of the features 1802 and 1902. The portions 2000 are ranked or classified into three categories; however, any number of categories is possible. The categories may represent a different level of criticality of that portion of the image. This classification may be determined by simulation, inspection of fabricated devices, design data (e.g., feature 1902), process data (e.g., tool offsets, process control data, etc.), and/or other methods. In an embodiment, class 1 portions are imaged with a higher image criteria (e.g., increased target of fidelity between the printed and as-drawn features) than class 2, class 2 portions are imaged with a higher image criteria than claim 3.

Figure 21A:
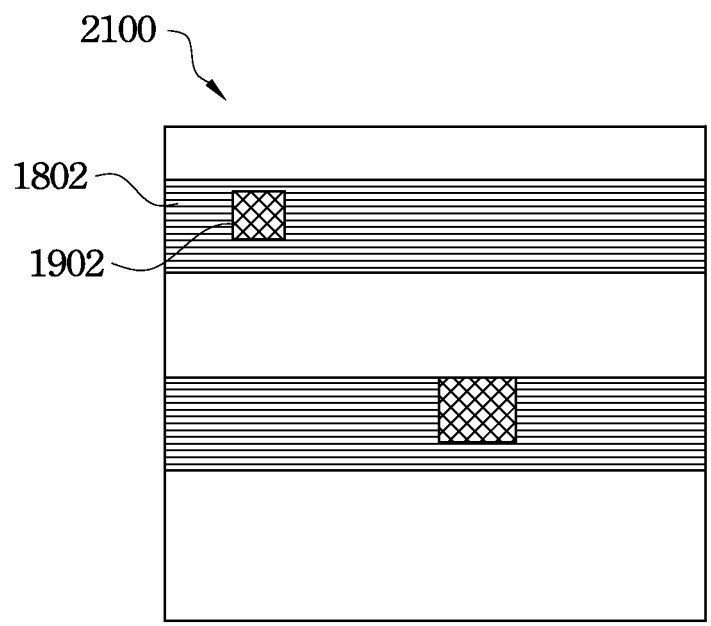
FIGS. 21A and 21B illustrate an embodiment of a semiconductor device layout and a corresponding semiconductor device according to one or more aspects of the present disclosure.
Figure 21B:
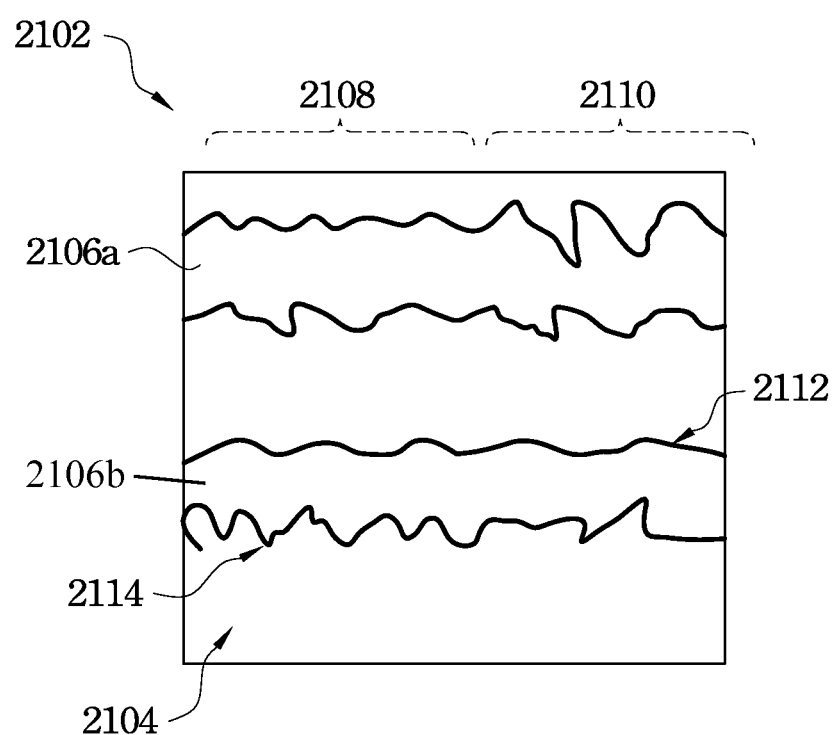

FIGS. 21A and 21B are illustrative of an embodiment of a portion of a layout and respective semiconductor device defined and fabricated using the systems and methods described herein. FIG. 21 illustrates a layout 2100 including a plurality of features 1802. In an embodiment, the features 1802 are representative of conductive lines such as, metal lines of an interconnect structure or multi-layer interconnect (MLI). The features 1802 may be formed on a first layer of the layout 2100. The layout 2100 may include a second layer, which has features 1902. In an embodiment, the features 1902 are representative of vias such as conductive vias providing a vertical interconnection between the features 1802 and other features (e.g., metal lines). It is important that the features 1902 land on the features 1802 to provide a suitable connection.

FIG. 21B is illustrative of a semiconductor device 2102 fabricated according the layout 2100 of FIG. 21A. The semiconductor device 2102 may be fabricated using the methods and systems described herein, including as illustrated above with reference to FIGS. 18-20, which illustrate a substantially similar layout.

In FIG. 21B, illustrated is a semiconductor substrate 2104 having features 2106a and 2106b formed thereon. The substrate 2104 may be a silicon substrate. Alternatively, the substrate 2104 may comprise another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In an embodiment, the features 2106a and 2106b are a conductive material, such as copper or aluminum typically used in interconnect fabrication. The conductive material may form an interconnect line such as a layer of a multi-layer interconnect structure (e.g., a metal 1 (metal 2, etc) line). The device 2102 may be an integrated circuit, or portion thereof, that may comprise static random access memory (SRAM) and/or other logic circuits, passive components such as resistors, capacitors, and inductors, and active components such as P-channel field effect transistors (PFET), N-channel FET (NFET), metal-oxide semiconductor field effect transistors (MOSFET), complementary metal-oxide semiconductor (CMOS) transistors, bipolar transistors, high voltage transistors, high frequency transistors, other memory cells, and combinations thereof. The features 2106a and 2106b may provide connection between and/or to one or more devices such as transistors formed on the substrate 2104.

The features 2106a and 2106b are defined by the features 1802 of the layout 2100 as modified by the methods and systems described herein (see FIG. 20). As illustrated each of the features 2106a and 2106b is asymmetric. The top (relatively speaking only) feature 2106a has a region 2108. The region 2108 is adjacent the feature 1902 of the layout 2100. The region 2108 (e.g., portion of the edge) may have been imaged using optimized lithography parameters. The top feature 2106a has other edges and edge portions that were not so imaged, such as the region 2110. Thus, the region 2108 may have a lower line edge roughness (LER). The region 2110 may have a higher LER. The opposing edge to those defined by regions 2108 and 2110 may also have a higher LER.

The bottom (relatively speaking only) feature 2106b has an edge 2112. The edge 2112 is an edge adjacent the feature 1902 of the layout 2100. (As described above with reference to FIGS. 19, 20, the feature 1902 may be closely adjacent the top edge of the feature 2106b thus, it is desired to have more accurate imaging of that edge.) The edge 2112 may have been imaged using optimized lithography parameters. The bottom feature 2106b has other edges and edge portions that were not so imaged, such as the opposing edge 2114. Thus, the edge 2112 may have a lower line edge roughness (LER). The edge 2114 may have a higher LER.

In summary, the methods and devices disclosed herein provide for systems and methods of identifying portions of a design and applying selected and distinguished image criteria to the identified portions. Thus, optimized lithography parameters may be developed for the specifically identified portions. In doing so, the present disclosure allows for a symmetrical device to be treated asymmetrically in terms of the lithography parameters and/or features and thus, can allow for printing of an asymmetrical feature from a symmetrical as-drawn feature. Embodiments of the systems and methods describes herein can offer several advantages over prior art devices. Advantages can include concentration of resources in manners that enhance the device in portions where it is of greater importance, increased imaged quality of features, and/or other benefits. It is understood that different embodiments disclosed herein offer different disclosure, and that they may make various changes, substitutions and alterations herein without departing from the spirit and scope of the present disclosure.

Thus, it will be appreciated that described herein is an embodiment of a method including providing a layout of a device having a pattern of features. The method continues to include identifying a first portion of at least one feature of the plurality of features. An image criteria for the first portion may be assigned. A lithography optimization parameter is determined based on the assigned image criteria for the first portion. Finally, the first portion of the at least one feature is imaged onto a semiconductor substrate using the determined lithography optimization parameter.

In a further embodiment, identifying the first portion includes determining a criticality of a fidelity of an image of the first portion on semiconductor substrate. In an exemplary embodiment, the first portion identified includes an edge of the first feature. In some embodiments the method may further include identifying a second portion of the at least one feature; assigning a second imaging criteria for the second portion; and determining a second lithography optimization parameter based on the assigned second image criteria for the second portion. In a further embodiment, the assigned second image criteria is a different value (e.g., magnitude) than the assigned image criteria for the first portion. In another embodiment, the second image criteria is a different category of image criteria (e.g., MEEF, PV band, ILS, etc.) than the image criteria for the first portion.

The assigning of the image criteria for the first portion may include an image criteria category such as depth of focus (DoF), intensity log slope (ILS), mask error enhanced factor (MEEF), process variation (PV) band, and/or edge position error (EPE).

The lithography optimization parameter may be a lithography process parameter (e.g., a recipe) and/or a resolution enhancement technique. The lithography process parameter may include a radiation source parameter, a pupil parameter, a knob parameter for a lens system, a wave-front modulation parameter, a Zernike term parameter, a polarization parameter, an off-axis illumination parameter, a numerical aperture (NA) parameter, and/or other suitable parameters. The resolution enhancement technique may include adding a scattering bar, adding a hammerhead, adding a serif, a modification of a placement of the first feature, a modification of a shape of the first feature, and a modification of a size of the first feature, and/or other RET (including OPC) practices.

The method may include, in embodiment, a first feature is symmetrical as defined by a layout file, but the imaging provides an imaged first feature on the semiconductor substrate that is asymmetrical.

In another of the broader embodiments described herein a method is described including receiving a layout of a device having a first feature and a second feature on a first layer of the layout. The first feature and the second feature are each symmetrical. The method continues to determine a first criticality of an edge of the first feature and a second criticality of an edge of the second feature. The criticality is determined based on a third feature defined by a second layer of the layout. A first optimized lithography parameter associated with the edge of the first feature is determined based on the determined first criticality. Likewise, a second optimized lithography parameter associated with the edge of the second feature is determined based on the determined second criticality. A photomask having the first feature and the second feature is used to image the first and second features onto a semiconductor substrate using the determined first and second optimized lithography parameters. The imaged first and second features are each asymmetrical.

In a further embodiment, the method includes determining a first optimized lithography parameter of a first resolution enhancement technique (RET) feature associated with the edge of the first feature based on the determined first criticality and determining a second optimized lithography parameter of a second RET feature associated with the edge of the second feature based on the determined second criticality. The photomask may include the first and second RET features.

In an embodiment, a third criticality of a second edge of the first feature is determined. A third optimized lithography parameter associated with the second edge of the first feature is then determined based on the third criticality. The third optimized lithography parameter is different than the first optimized lithography parameter (e.g., asymmetrical).

In the method, the first optimized lithography parameter and the second optimized lithography parameter may include different values for at least one of lithography parameter such as a radiation source parameter, a polarization parameter, a pupil parameter, a parameter of a knob of a lens system of a lithography tool, a Zernike term parameter, an off-axis illumination parameter, a numerical aperture (NA) parameter, a wave front modulation parameter, and combinations thereof.

In another of the broader forms discussed herein, an integrated circuit (IC) design system is described and includes a processor; a communication module and a non-transitory, computer-readable storage communicatively coupled to the processor. The communication module is communicatively coupled to the processor and configured to receive an IC design layout having a feature. The non-transitory, computer-readable storage includes instructions executable by the processor that include instructions to perform an identification of a portion of the feature; instructions to perform assign a value for an image criteria for the identified portion; and instructions to optimize a lithography process parameter based on the assigned value of the image criteria for the identified portion. The non-transitory, computer-readable storage may include instructions to repeat the instructions to perform the identification, the instructions to perform the assignment of the value, and the instructions to optimize the lithography process parameter, for each of a plurality of different portions of the feature.

In a further embodiment, the instructions also include instructions to communicate the optimized lithography process parameter to one of a mask fabrication system and a lithography tool. In an embodiment, the instructions to optimize the lithography process include determining a resolution enhancement technique to be performed on the IC design layout. In an embodiment, the instructions to optimize the lithography process include performing a simulation to determine a resolution enhancement technique or an imaging process parameter to be used by a lithography tool.

In yet another of the broader embodiments discussed herein, a semiconductor device is provided that has an asymmetric feature. The asymmetric feature may have a first edge that has a first line edge roughness (LER) and a second edge, opposing the first edge, which has a second line edge roughness. It is noted that other properties of the edges may also or alternatively provide asymmetry of the feature.

In an embodiment, the feature is substantially rectangular. In a further embodiment, the feature may be an interconnect line. The interconnect line may be copper. In an embodiment, the first LER is lower than the second LER and the first edge is adjacent (e.g., nearer) a via structure.

What is claimed is:

1. A method, comprising:
   determining a baseline image criteria for a first portion of at least one feature of a plurality of features;
   assigning an image criteria for the first portion of the at least one feature of the plurality of features based on a deviation from the baseline image criteria;
   determining a first lithography optimization parameter based on the assigned image criteria for the first portion; and
   imaging the first portion of the at least one feature using the determined first lithography optimization parameter to provide an asymmetrical imaged first feature.

2. The method of claim 1, further comprising:
   prior to determining the baseline image criteria, providing a layout of a device having the plurality of features.

3. The method of claim 1, wherein the imaging the first portion further includes imaging the first portion onto a semiconductor substrate.

4. The method of claim 1, wherein the at least one feature is symmetrical as defined by a layout file.

5. The method of claim 1, wherein the baseline image criteria is based on a technology node used to fabricate the device.

6. The method of claim 1, wherein the assigning the image criteria includes assigning a user-defined image criteria; assigning the image criteria determined by simulation; assigning the image criteria determined from a look-up table; assigning a image criteria based on characterization data; and combinations thereof.

7. The method of claim 1, wherein the image criteria for the first portion includes an image criteria selected from the group consisting of depth of focus (DoF); intensity log slope (ILS); mask error enhanced factor (MEEF); process variation (PV) band; edge position error (EPE); and combinations thereof.

8. The method of claim 1, further comprising:
   assigning an image criteria for a second portion of the at least one feature of the plurality of features based on another deviation from the baseline image criteria; and
   determining a second lithography optimization parameter based on the assigned second image criteria for the second portion.

9. The method of claim 8, wherein the assigned image criteria for the second portion is a different value than the assigned image criteria for the first portion.

10. The method of claim 8, wherein the assigned image criteria for the second portion is a different category of image criteria than the assigned image criteria for the first portion.

11. A method, comprising:
    identifying a plurality of portions of a layout of a symmetrical integrated circuit feature;
    determining a relative ranking for each portion of the identified plurality of portions based on a criticality of each portion of the identified plurality of portions;
    assigning an image criteria for each portion of the identified plurality of portions based, at least in part, on the determined relative ranking; and
    imaging each portion of the identified plurality of portions to provide an asymmetrical imaged integrated circuit feature, wherein a fidelity between each imaged portion and the layout of each portion of the plurality of portions is based on the assigned image criteria.

12. The method of claim 11, further comprising:
    prior to imaging each portion of the identified plurality of portions, determining an optimization parameter based on the assigned image criteria.

13. The method of claim 11, further comprising:
    determining the relative ranking, wherein the criticality of each portion of the identified plurality of portions is determined by a layout feature in a surrounding environment of the symmetrical integrated circuit feature.

14. The method of claim 11, wherein the relative ranking of a first portion of the identified plurality of portions is greater than that of a second portion of the identified plurality of portions, and wherein a first fidelity between the imaged first portion and the layout of the first portion is greater than a second fidelity between the imaged second portion and the layout of the second portion.

15. The method of claim 11, wherein the symmetrical integrated circuit feature includes a fin element of a FinFET device.

16. The method of claim 14, wherein asymmetrical imaged integrated circuit feature is a mandrel having a first edge and an opposing second edge, wherein the first edge includes the first portion and the second edge includes the second portion, and wherein a subsequently formed FinFET device includes a fin element formed on the first portion.

17. A method, comprising:
    determining a first and second baseline image criteria for each of a first and second portion of an integrated circuit feature;
    assigning a first ranking to the first portion based on a deviation from the first baseline image criteria and a second ranking to the second portion based on a deviation from the second baseline image criteria;

imaging the first and second portions to provide an asymmetrical integrated circuit feature, wherein the first ranking is greater than the second ranking, and wherein a first fidelity between the imaged first portion and a layout of the first portion is greater than a second fidelity between the imaged second portion and a layout of the second portion.

18. The method of claim 17, further comprising:
prior to imaging the first and second portions, assigning an image criteria to each of the first and second portions based on the assigned first and second rankings.

19. The method of claim 18, further comprising:
prior to imaging the first and second portions, determining optimization parameters based on the assigned image criteria.

20. The method of claim 17, wherein the integrated circuit feature is symmetrical as defined by a layout file.

* * * * *